United States Patent [19]

Steinbrenner

[11] Patent Number: 4,532,908
[45] Date of Patent: Aug. 6, 1985

[54] CONTROL DEVICE FOR METERING FUEL IN A SUPERCHARGED INTERNAL COMBUSTION ENGINE

[75] Inventor: Ulrich Steinbrenner, Stuttgart, Fed. Rep. of Germany

[73] Assignee: Robert Bosch GmbH, Stuttgart, Fed. Rep. of Germany

[21] Appl. No.: 509,092

[22] Filed: Jun. 29, 1983

[30] Foreign Application Priority Data

Sep. 24, 1982 [DE] Fed. Rep. of Germany ....... 3235346

[51] Int. Cl.³ .............................................. F02D 5/00
[52] U.S. Cl. .................................. 123/493; 123/325; 123/478
[58] Field of Search ............... 123/493, 478, 494, 325; 60/601, 603, 605

[56] References Cited

U.S. PATENT DOCUMENTS 3,661,126 5/1972 Baxendale .......................... 123/494
4,044,560 8/1977 Dorsch et al. ........................ 60/601
4,221,191 9/1980 Asano et al. ....................... 123/493
4,450,814 5/1984 Sawamoto et al. ................. 123/478

FOREIGN PATENT DOCUMENTS 57-52647 3/1982 Japan .................................. 123/494

Primary Examiner—Andrew M. Dolinar
Attorney, Agent, or Firm—Edwin E. Greigg

[57] ABSTRACT

A control device for a supercharged internal combustion engine is proposed, in which a device for fuel limitation during overrunning is also used for limiting the fuel metering in a definite manner in the event that a threshold value of the charge pressure is exceeded. To this end, a switch actuated by the charge pressure is connected parallel to a switch triggered during overrunning. In the event that the threshold value of the charge pressure is exceeded, overrunning is simulated accordingly, and the associated provisions for fuel limitation for such an event are initiated.

14 Claims, 3 Drawing Figures

CONTROL DEVICE FOR METERING FUEL IN A SUPERCHARGED INTERNAL COMBUSTION ENGINE

BACKGROUND OF THE INVENTION

The invention is based on a control device for an internal combustion engine operated with supercharging as generally defined hereinafter. A safety device for a supercharged internal combustion engine is already known in combination with a fuel metering system, in which the fuel metering is controlled in accordance with the volumetric efficiency of degree of charge of the engine (German Offenlegungsschrift No. 3026150 and U.S. Ser. No. 282,339). In the case of an excessively high degree of charge, a defect of the supercharger or its regulator is assumed. To protect the engine from mechanical or thermal overload, the fuel metering is reduced or shut off entirely in the case of such a defect.

One disadvantage of this known safety device is that a failure or malfunction in the devices used for measuring the degree of charge, such as an air flow sensor or an rpm meter, can cause an incorrect determination of the volumetric efficiency. The excessive charge which may possibly be effected as a result can destroy the engine in only a few seconds.

A method for the operation of and a device for a fuel metering system in an internal combustion engine during overrunning is also known (German Offenlegungsschrift No. 2801790 and U.S. Pat. No. 4,311,123). The method is distinguished by the provision that the fuel supply is reduced at the onset of overrunning and then shut off in accordance with an elective function. After the end of overrunning, the supply of fuel is resumed according to an elective function. This method includes characteristics for the control device according to the invention in the case of an engine operated with supercharging—such as the shutoff of the fuel supply—although the method per se is used only for braking the vehicle equipped with an internal combustion engine in the event of overrunning.

OBJECT AND SUMMARY OF THE INVENTION

The control device for a supercharged internal combustion engine according to the invention has the advantage over the prior art that even if a measurement value receiver receiving the characteristic variables for determining engine load should fail, the destruction of the engine is avoided in that a further control device, based on the measurement of the charge pressure, is provided for the fuel metering. This control device is distinguished by its great simplicity, in that if the maximum permissible charge pressure is exceeded, a signal is delivered to an electronic control unit, which signal starts the "Limitation of Fuel Supply During Overrunning" routine. In the case of a failure, overrunning may be said to be simulated by this device.

Advantageous further developments of and improvements to the control device disclosed are possible. A particularly advantageous feature is the parallel connection of the two switches triggered during overrunning and by means of the charge pressure, as a result of which the fuel limitation can be triggered alternatively by one of the two sensors.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
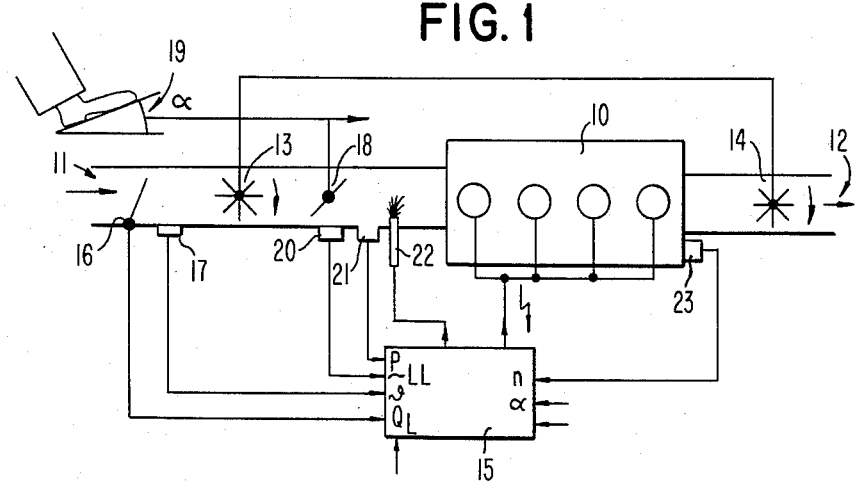
FIG. 1 shows the basic design of an internal combustion engine operated with supercharging.

FIG. 1 shows the schematic design of an internal combustion engine operated with supercharging, as well as an electronic control unit for the fuel metering and the ignition. The engine per se is identified as 10, and it has an air inlet tube 11 and an exhaust gas tube 12. A compressor 13 is located in the air inlet tube 11 and a turbine 14 of a turbocharger is located in the exhaust gas tube 12. An electronic control unit 15, which among other things controls fuel metering and/or the instant of ignition, is connected with various measurement value transducers or sensors, which will be described below. In addition to an air flow transducer 16, a temperature sensor 17 is also disposed in the air inlet tube 11 upstream of the turbine 14. The position of a throttle valve 18 following the compressor 13 is registered via an angular position transducer 19. A throttle valve switch 20 is also present, which furnishes a signal when the throttle valve 18 is closed. Finally, a pressure sensor 21 for measuring the charge pressure follows, as well as an injection nozzle 22 for the purpose of fuel metering. Further data are transmitted to the electronic control unit 15 from an rpm transducer 23 disposed on the engine 10.

Figure 2:
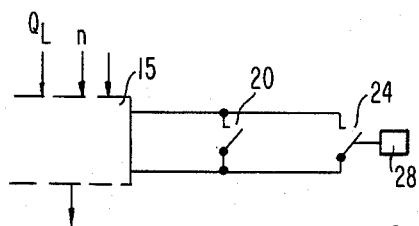
FIG. 2 shows one possible realization of the control device.

FIG. 2 shows a special, particularly simple realization of the invention. The idling switch 20 connected to the elctronic control unit 15 has a further switch 24, actuated directly by the charge pressure, connected parallel to it. In this exemplary embodiment, the criterion for recognizing overrunning is the closed state of the throttle valve 18. With the simultaneous closure of the idling switch 20, suitable measures are initiated by the electronic control unit 15, for instance a reduction in the fuel supply. As a result of the parallel connection of the pressure switch 24, a fuel reduction or blockage of fuel supply can be attained in the same manner upon the exceeding of the maximum permissible charge pressure. By the incorporation of the switch 24, effective protection of the engine from excessive pressure is assured merely by using control functions which are already available without any further electronic provisions. A mechanical or electronic averaging device 28 may be disposed into the circuit, as shown, for actuating the switch 24.

Figure 3:
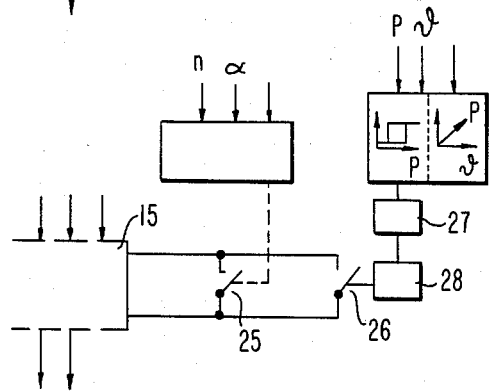
FIG. 3 shows another possible realization of the control device.

FIG. 3 shows a further specialized realization of the invention in which a parallel circuit comprising a switch 25 and a further switch 26 is connected to the electronic control unit 15. In contrast to the exemplary embodiment of FIG. 2, the switches 25 and 26 are not actuated directly by the variables for the charge pressure and the position of the throttle valve. For instance, it may be necessary to actuate the switch 25 not only whenever the throttle valve is in the idling position but also whenever the actual rpm of the engine exceeds a certain value predetermined by the throttle valve position. It may furthermore be necessary to vary the maximum permissible value for the charge pressure in accordance with additional parameters, such as the temperature or atmospheric pressure. In addition, the pressure transducer may be connected with a comparator 27, so that the switching characteristic of the switch 26 includes an imposed hysteresis. In order to prevent the acutation of the switch 26 in response to brief pressure peaks during acceleration or switching, an electronically- or mechanically-controlled average value former 28 may be disposed in the circuit between the switch 26 and the comparator 27.

The field of applicability of the present invention is in no manner whatever restricted to internal combustion engines having gasoline injection, as might be considered apparent from FIG. 1, but rather can be extended to encompass Diesel engines as well.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A control device including means for controlling the metering of fuel in an internal combustion engine operated with supercharging and dependent, for instance, upon aspirated air quantity, rpm, air temperature and throttle valve position, comprising a first switching means connected to said controlling means for reducing the supply of fuel during overrunning, and a second switching means connected in parallel with said first switching means and responsive to charge pressures above a predetermined charge pressure for reducing the supply of fuel, whereby overrunning the supply of fuel is reduced during at least one of the following conditions: overruning and excessive charge pressures.

2. A control device for fuel metering as defined by claim 1, wherein said first switching means is an idling switch actuated by the throttle valve.

3. A control device for fuel metering as defined by claim 1, wherein said second switching means is actuated directly by the charge pressure.

4. A control device for fuel metering as defined by claim 1, wherein said first switching means is controllable in accordance with a driving pedal position and with the rpm.

5. A control device for fuel metering as defined by claim 1, wherein said second switching means is actuated indirectly by the charge pressure and other variables characterizing an overload of the engine.

6. A control device for fuel metering as defined by claim 5, wherein a controllable comparator is incorporated between a pressure sensor and said second switching means.

7. A control device for fuel metering as defined by claim 1, wherein the actuation of said second switching means is performed by means of a mechanical averaging device.

8. A control device for fuel metering as defined by claim 3, wherein the actuation of said second switching means is performed by means of a mechanical averaging device.

9. A control device for fuel metering as defined by claim 5, wherein the actuation of said second switching means is performed by means of a mechanical averaging device.

10. A control device for fuel metering as defined by claim 1, wherein the actuation of said second switching means is performed by means of an electronic averaging device.

11. A control device for fuel metering as defined by claim 3, wherein the actuation of said second switching means is performed by means of an electronic averaging device.

12. A control device for fuel metering as defined by claim 5, wherein the actuation of said second switching means is performed by means of an electronic averaging device.

13. A control device for fuel metering as defined by claim 6, wherein the actuation of said second switching means is performed by means of an electronic averaging device.

14. A control device for fuel metering as defined by claim 6, wherein the actuation of said second switching means is performed by means of a mechanical averaging device.

* * * * *